United States Patent
Ogawa

(10) Patent No.: US 11,984,142 B2
(45) Date of Patent: May 14, 2024

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kenji Ogawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/943,015

(22) Filed: Sep. 12, 2022

(65) Prior Publication Data
US 2023/0306989 A1    Sep. 28, 2023

(30) Foreign Application Priority Data
Mar. 24, 2022    (JP) .................................. 2022-048989

(51) Int. Cl.
*G11B 20/12*    (2006.01)
*G11B 5/012*    (2006.01)

(52) U.S. Cl.
CPC .................................. *G11B 5/012* (2013.01)

(58) Field of Classification Search
CPC .... G11B 5/54; G11B 5/00; G11B 5/09; G11B 27/36; G11B 20/18; G11B 5/004; G11B 20/12
USPC ........................................................ 360/31, 48
See application file for complete search history.

(56) References Cited

U.S. PATENT DOCUMENTS

| | | | |
|---|---|---|---|
| 7,627,725 B2 | 12/2009 | Yoshida | |
| 8,472,295 B1 * | 6/2013 | Jin | G11B 20/1217 369/53.16 |
| 2010/0064198 A1 | 3/2010 | Yoshida et al. | |
| 2019/0332480 A1 | 10/2019 | Kang et al. | |

* cited by examiner

*Primary Examiner* — Nabil Z Hindi
(74) *Attorney, Agent, or Firm* — Kim & Stewart LLP

(57) ABSTRACT

According to one embodiment, a magnetic disk apparatus includes a magnetic disk, a magnetic head, and a controller. The magnetic disk is provided with a track including a plurality of first sectors. The controller accesses the magnetic disk by using the magnetic head. The plurality of first sectors includes a plurality of second sectors where data segments are written and a third sector where parity and first information indicating effectiveness or ineffectiveness of protection by the parity are written.

14 Claims, 10 Drawing Sheets

MAGNETIC DISK APPARATUS AND METHOD

CROSS-REFERENCE TO RELATED APPLICATIONS

This application is based upon and claims the benefit of priority from Japanese Patent Application No. 2022-048989, filed on Mar. 24, 2022, the entire contents of which are incorporated herein by reference.

FIELD

Embodiments described herein relate generally to a magnetic disk apparatus and a method.

BACKGROUND

In the related art, there are cases where each track is provided with a sector dedicated for parity. Hereinafter, a sector dedicated for parity is referred to as "parity sector". A sector for data, which is different from the parity sector is referred to as "data sector".

Parity written to a parity sector is generated on the basis of data segments written to a plurality of data sectors in a track. Accordingly, the data segments written to the plurality of data sectors in the track are protected by the parity written to the parity sector.

DETAILED DESCRIPTION

When data is overwritten to part of a data sector after parity is written to a parity sector, protection by the parity becomes ineffective. When error correction using the parity is implemented while the protection by the parity is ineffective, the error correction could cause such a situation that data different from desired data is obtained. Therefore, there is a need to manage effectiveness or ineffectiveness of the protection by the parity in units of tracks.

According to this embodiment, a magnetic disk apparatus includes a magnetic disk, a magnetic head, and a controller. The magnetic disk is provided with a track including a plurality of first sectors. The controller is configured to access the magnetic disk by using the magnetic head. The plurality of first sectors includes a plurality of second sectors where a data segment is written and a third sector where parity and first information indicating effectiveness or ineffectiveness of protection by the parity are written.

Exemplary embodiments of a magnetic disk apparatus and a method will be explained below in detail with reference to the accompanying drawings. The present invention is not limited to the following embodiments.

First Embodiment

Figure 1:
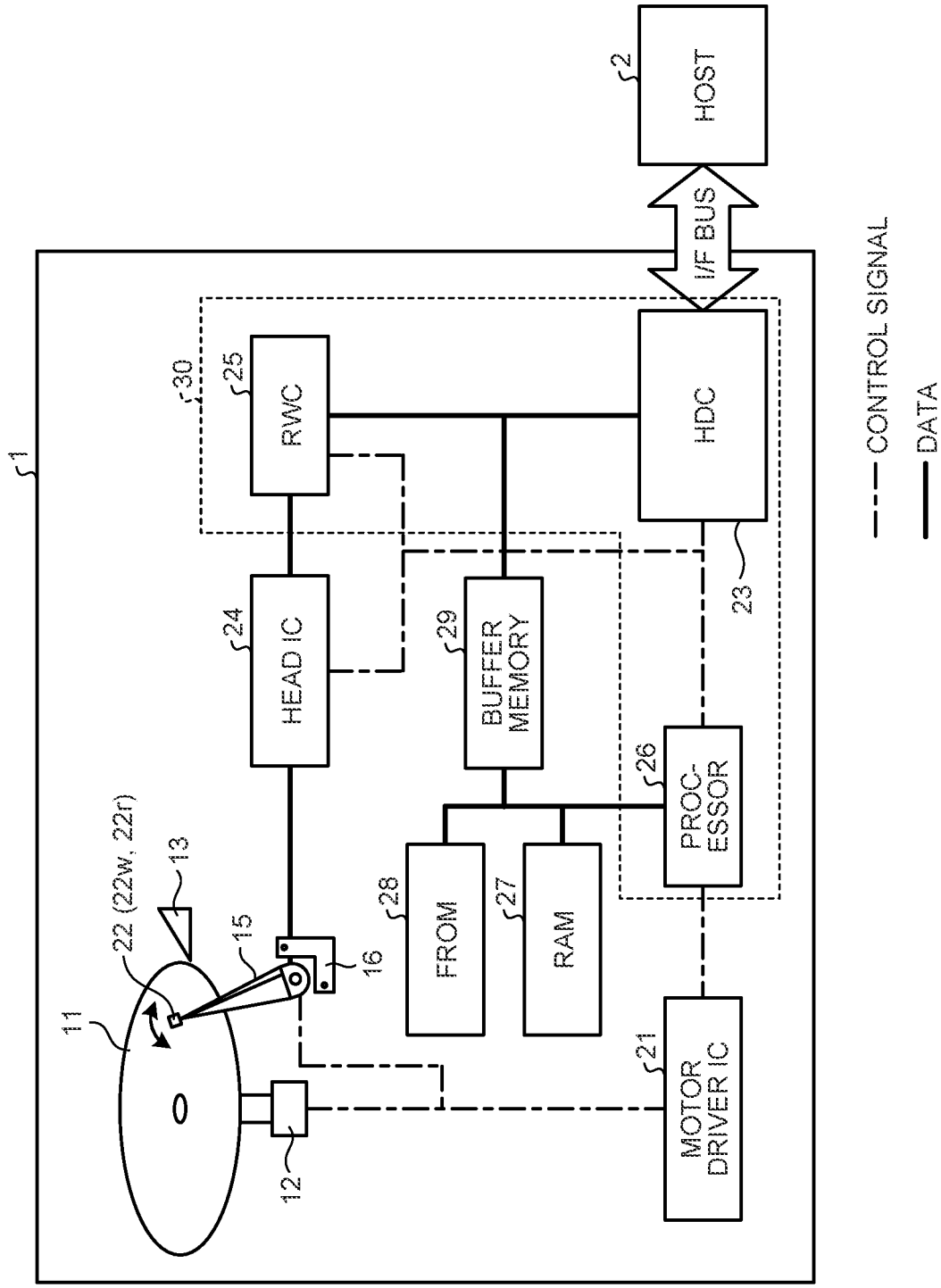
FIG. 1 is a schematic view illustrating an example of a configuration of a magnetic disk apparatus according to a first embodiment.

FIG. 1 is a schematic view illustrating an example of a configuration of a magnetic disk apparatus 1 according to a first embodiment.

The magnetic disk apparatus 1 is connected to a host 2. The magnetic disk apparatus 1 receives an access command such as write command or read command from the host 2.

The magnetic disk apparatus 1 includes a magnetic disk 11 having a surface provided with a magnetic layer. The magnetic disk apparatus 1 writes data to the magnetic disk 11 and reads data from the magnetic disk 11 in accordance with the access command.

Write and read of data are performed via a magnetic head 22. Specifically, in addition to the magnetic disk 11, the magnetic disk apparatus 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a predetermined rotation speed by the spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes to or reads from the magnetic disk 11 by a write head 22w and a read head 22r included in the magnetic head 22. The magnetic head 22 is attached to a leading end of the actuator arm 15. The magnetic head 22 is moved in a radial direction of the magnetic disk 11 by the VCM 16 driven by the motor driver IC 21.

For example, when the rotation of the magnetic disk 11 is stopped, the magnetic head 22 is moved onto the ramp 13. The ramp 13 is configured to hold the magnetic head 22 at a position apart from the magnetic disk 11.

During the read, the head IC 24 amplifies and outputs a signal read by the magnetic head 22 from the magnetic disk 11 and supplies the signal to the RWC 25. During the write, the head IC 24 amplifies a signal corresponding to data supplied from the RWC 25 and supplies the signal to the magnetic head 22.

The RWC 25 performs modulation including error correction coding on data supplied from the HDC 23 and supplies the data to the head IC 24. The RWC 25 also performs demodulation including error correction on the signal read from the magnetic disk 11 and supplied from the head IC 24 and outputs the signal to the HDC 23 as digital data.

The error correction coding implemented by the RWC 25 includes: error correction coding for correction by sector error correcting code (ECC), and generation of parity for correction by track ECC. The error correction implemented by the RWC 25 includes the correction by sector ECC and the correction by track ECC. The correction by sector ECC and the correction by track ECC will be described later.

The HDC 23 controls, for example, transmission and reception of data to and from the host 2 via an I/F bus and controls the buffer memory 29.

The buffer memory 29 is used as a buffer for data transmitted to and received from the host 2. The buffer memory 29 includes, for example, a volatile memory capable of high-speed operation. The memory included in the buffer memory 29 is not limited to a specific type. The buffer memory 29 may include, for example, a dynamic random access memory (DRAM), a static random access memory (SRAM), or a combination thereof.

The processor 26 is, for example, a central processing unit (CPU). The RAM 27, the flash read only memory (FROM) 28, and the buffer memory 29 are connected to the processor 26.

The FROM 28 stores, for example, firmware (program data) and various operation parameters. When power supply is stopped, the FROM 28 is used as an emergency storage for various types of information inside the RAM 27. Part of or all the firmware may be stored in the magnetic disk 11.

The RAM 27 includes, for example, a DRAM, an SRAM, or a combination thereof. The RAM 27 is used by the processor 26 as a region where the firmware is loaded or where various types of management information are cached or buffered.

The processor 26 loads the firmware from the FROM 28 into the RAM 27 and controls, for example, the motor driver IC 21, the head IC 24, the RWC 25, and the HDC 23 in accordance with the loaded firmware. In the control, the processor 26 uses the various types of management information cached or buffered in the RAM 27.

A configuration including the RWC 25, the processor 26, and the HDC 23 may also be considered as the controller 30. In addition to these components, the controller 30 may include other components (such as the RAM 27, the FROM 28, and the buffer memory 29).

Part of or all the functions of the controller 30 may be achieved by a hardware circuit such as a field-programmable gate array (FPGA) and an application specific integrated circuit (ASIC). Alternatively, part of or all the functions of the controller 30 may be achieved by the processor 26 by executing the firmware.

Figure 2:
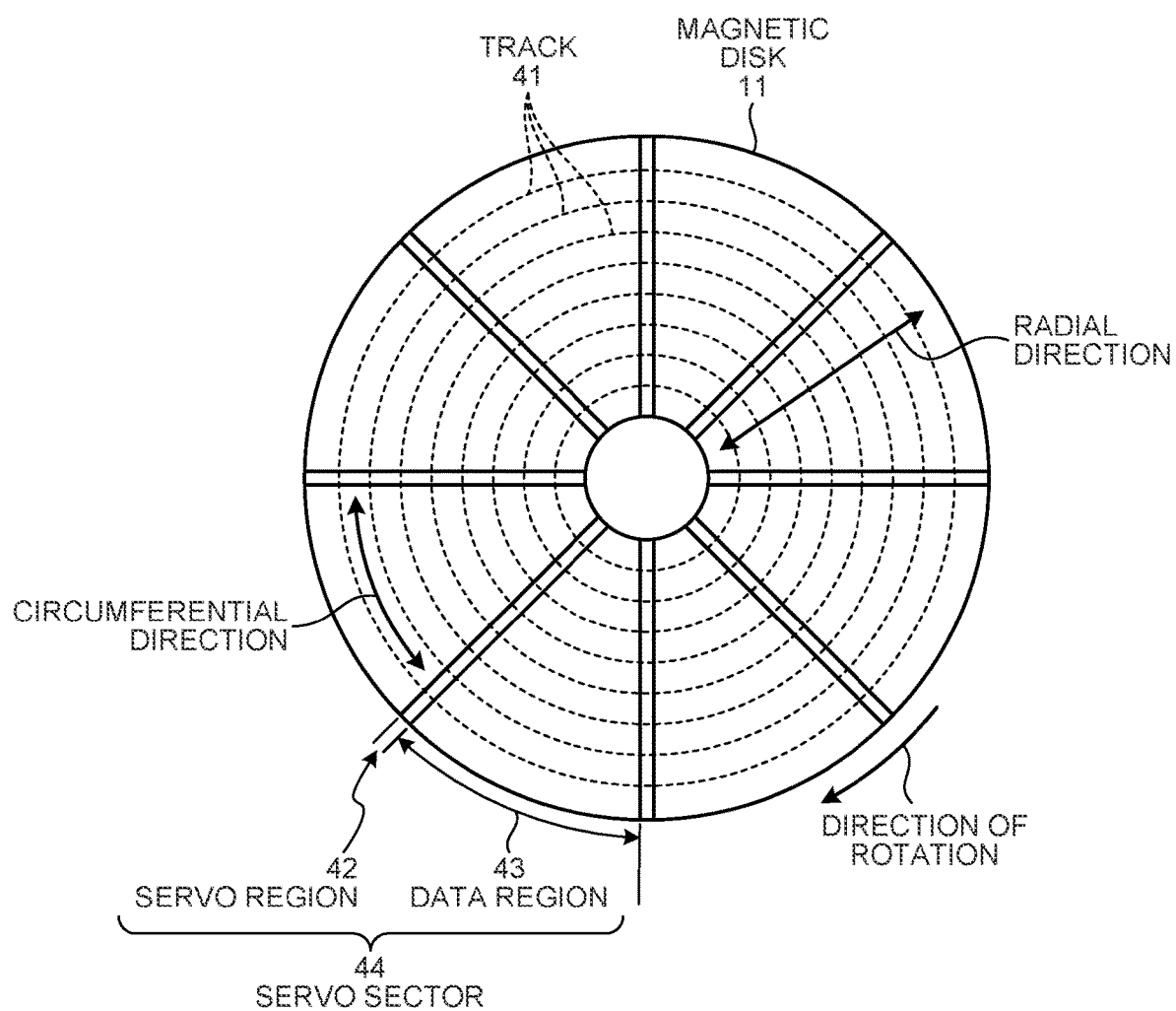
FIG. 2 is a schematic view illustrating an example of a configuration of a magnetic disk according to the first embodiment.

FIG. 2 is a schematic view illustrating an example of a configuration of the magnetic disk 11 according to the first embodiment.

In a manufacturing process, servo information is written to the magnetic disk 11 by, for example, a servo writer or self-servo writing (SSW). FIG. 2 illustrates a radial arrangement of servo regions 42 as an example of the arrangement of servo regions where the servo information is written.

The servo information includes, for example, sector/cylinder information, burst pattern, and post code. The sector/cylinder information offers position information (servo sector address) of the magnetic disk 11 in a circumferential direction and position information (track number) of a track set in the radial direction. A track number obtained from the sector/cylinder information is an integer value representing a position of a track, and the burst pattern represents an offset after the decimal point on the basis of the position represented by the track number. The post code is an amount of correction for correcting distortion of the shape of a track set on the basis of a combination of the sector/cylinder information and the burst pattern.

The processor 26 and the motor driver IC 21 implement positioning control of the magnetic head 22 such as seeking and following on the basis of the servo information read from the servo regions 42.

A data region 43 where data can be written is placed between the servo regions 42. One servo region 42 and one data region 43 subsequent to the one servo region 42 constitute a servo sector 44. Concentric tracks 41 are provided in the radial direction of the magnetic disk 11.

In the data region 43, sectors are provided along the tracks 41. Write and read are implemented by the magnetic head 22 in units of sectors. A storage capacity of each sector is set optionally but basically uniform within the magnetic disk 11.

Figure 3:
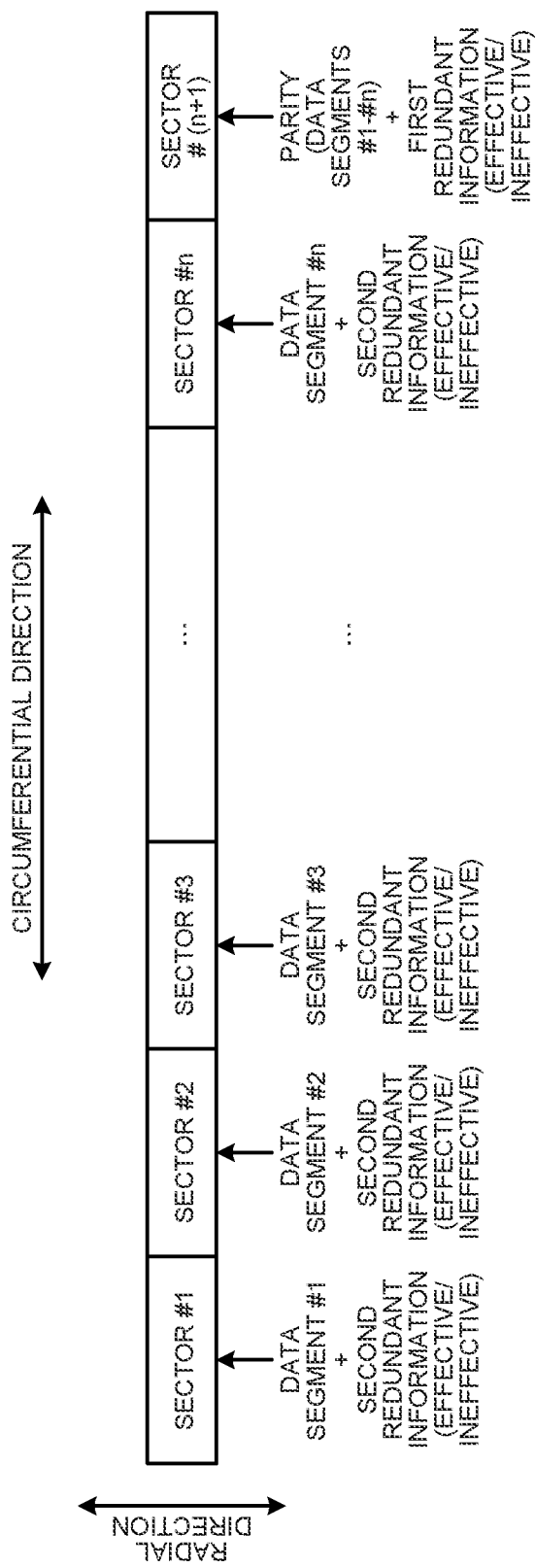
FIG. 3 is a schematic view illustrating an example of a configuration of one track according to the first embodiment.

FIG. 3 is a schematic view illustrating an example of a configuration of one track 41 according to the first embodiment. In the drawing, illustration of the servo regions 42 is omitted.

Each sector is identified by a sector number. A sector with the sector number "x" is referred to as Sector #x. In the example illustrated in FIG. 3, the track 41 includes (n+1) sectors containing Sector #1 to Sector #(n+1).

The end of the (n+1) sectors, that is, Sector #(n+1) with the largest sector number is a dedicated sector where parity is written. Data segments #1 to #n having sizes corresponding to the respective sectors are written to n Sectors #1 to #n. Parity generated on the basis of the n Data segments #1 to #n written to Sectors #1 to #n is written to Sector #(n+1).

Accordingly, when n data segments are written to Sectors #1 to #n and the parity generated on the basis of the n data segments is written to Sector #(n+1), the n data segments written to Sectors #1 to #n are protected by the parity. In other words, even when read from any of n Sectors #1 to #n fails, error correction using the parity written to Sector #(n+1) enables acquisition of data segments with no error. Note that the failure in the read refers to failure in acquiring data segments with no error. More specifically, the failure in the read signifies failure in implementing the correction by sector ECC on data segments read.

Hereinafter, a sector where parity is written like Sector #(n+1) is referred to as "parity sector". Moreover, a sector where a data segment to be used for generation of the parity is written like each of Sectors #1 to #n is referred to as "data sector".

In one track 41, when parity generated on the basis of all data segments written to all data sectors is written to the parity sector, all the data segments are protected by the parity. After that, when a data segment is overwritten to part of the data sectors in the track 41, the protection by the parity becomes ineffective unless the parity is updated in accordance with the overwrite.

When the error correction using the parity is implemented while the protection by the parity is ineffective, the error correction could cause such a situation that data segments different from desired data segments are obtained. Therefore, there is a need to manage effectiveness or ineffectiveness of the protection by the parity in units of tracks 41.

Here, a technique compared with the embodiment will be described. The technique compared with the embodiment is referred to as "Comparative Example". In Comparative Example, a RAM is used for caching management information recorded for each track, or information associated with effectiveness or ineffectiveness of the protection by the parity, and the management information is referred to and updated in the RAM. The management information is stored in a magnetic disk or a FROM in a timely manner so as not to be lost from a magnetic disk apparatus even after a cycle of stop and restart of power supply. For example, while the power supply is continued, an update of the management information is stored in the magnetic disk every time the management information is updated. When the power supply is stopped, an update of the management information is stored in the FROM using, for example, a back electromotive force of a spindle motor.

In recent years, a magnetic disk in a magnetic disk apparatus has an enormous number of tracks. Management information has a size corresponding to the number of tracks of a magnetic disk. For this reason, when Comparative Example is applied to a magnetic disk apparatus of recent years, enormous-sized management information is placed in a RAM. An access to a magnetic disk and FROM causes a relatively large overhead. For this reason, when the magnetic disk apparatus of Comparative Example is configured to store management information every time the management information is updated, the response performance to a host deteriorates due to hardware resources allocated for storing an update of the management information.

In order to prevent deterioration in response performance to the host, the magnetic disk apparatus of Comparative Example may be configured to store an update of the management information after accumulating a predetermined number of updates of the management information. In this configuration, however, too many unsaved updates accumulated in the RAM makes it difficult to complete saving of the updates in the FROM when the power supply is stopped.

In the first embodiment, not only the parity but also first redundant information or bit information indicating either effectiveness or ineffectiveness of the protection by the parity are written to the parity sector in each track 41. When read from a data sector as a target of read fails, the controller 30 reads the first redundant information while the magnetic head 22 is maintained on the track 41 that includes the data sector as a target of read, and the controller 30 specifies effectiveness or ineffectiveness of the protection by the parity on the basis of the read first redundant information.

In short, according to the first embodiment, there is no need to store the management information in the RAM 27. Therefore, the RAM 27 is downsized in the first embodiment as compared with Comparative Example. In addition, it is possible to prevent deterioration in response performance to the host 2 which is attributed to a process for storing an update of the management information within the RAM 27 in the magnetic disk 11. Moreover, there is no need to store an update of the management information in the FROM 28 when the power supply is stopped.

Still further, in the first embodiment, in addition to a data segment, second redundant information indicating effectiveness or ineffectiveness of the protection by the parity is written to each data sector so that effectiveness or ineffectiveness of the protection by the parity is determined to the extent possible. When a data segment as target of write is written to part of the data sectors in the track 41, the controller 30 not only writes a value indicating ineffectiveness as the first redundant information to the parity sector but also writes the value indicating ineffectiveness as the second redundant information to each data sector as a target of write.

A data segment written to each data sector is individually subjected to error correction coding. That is, the controller 30 (more specifically, the RWC 25) decodes a data segment read from one data sector, thereby implementing error correction on the data segment. Error correction in units of sectors is referred to as "correction by sector ECC". On the other hand, error correction using the parity written to the parity sector is referred to as "correction by track ECC".

The controller 30 implements the correction by sector ECC on a data segment read from a data sector as a target of read. When the correction by sector ECC is unsuccessful, the controller 30 starts the correction by track ECC. Note that before the correction by track ECC starts, the read from the data sector as a target of read and the correction by sector ECC on the read data segment may be re-implemented a predetermined number of times, that is, one or more times until the correction by sector ECC is successful. The repeated read from the data sector as a target of read and the repeated correction by sector ECC on the read data segment are also referred to as "read retry".

In implementing the correction by track ECC, the controller 30 determines effectiveness or ineffectiveness of the protection by the parity on the basis of the first redundant information or the second redundant information. When the protection by the parity is effective and the correction by track ECC is successful, the data segment with no error obtained by the correction by track ECC is used for the subsequent processing, for example, the response performance to the host 2. When the protection by the parity is ineffective, the correction by track ECC is aborted. Alternatively, when the correction by track ECC is completed, the data segment obtained by the correction by track ECC is discarded.

An error correction coding method for the correction by sector ECC is not limited to a specific method. For example, a low-density parity-check code is applicable as an error correction coding method for the correction by the sector ECC.

An error correction coding method for the correction by track ECC, that is, a method for generating parity is not limited to a specific method. For example, parity is generated by a bitwise XOR operation for all data segments written to all data sectors.

The condition for starting the correction by track ECC is not limited to a failure of the correction by sector ECC on a data segment read from a data sector as a target of read. The controller 30 may be configured to start the correction by track ECC under any condition. For example, the controller 30 may be configured to start the correction by track ECC when targets of read are all data sectors in the track 41. The controller 30 may be configured to start the correction by track ECC when off-track occurs during the read even though the correction by sector ECC is successful.

Each sector in one track 41 is an example of a first sector. Each data sector is an example of a second sector. The parity sector is an example of a third sector. The first redundant information is an example of first information. The second redundant information is an example of second information.

Hereinafter described are operations of the magnetic disk apparatus 1 according to the first embodiment.

Figure 4:
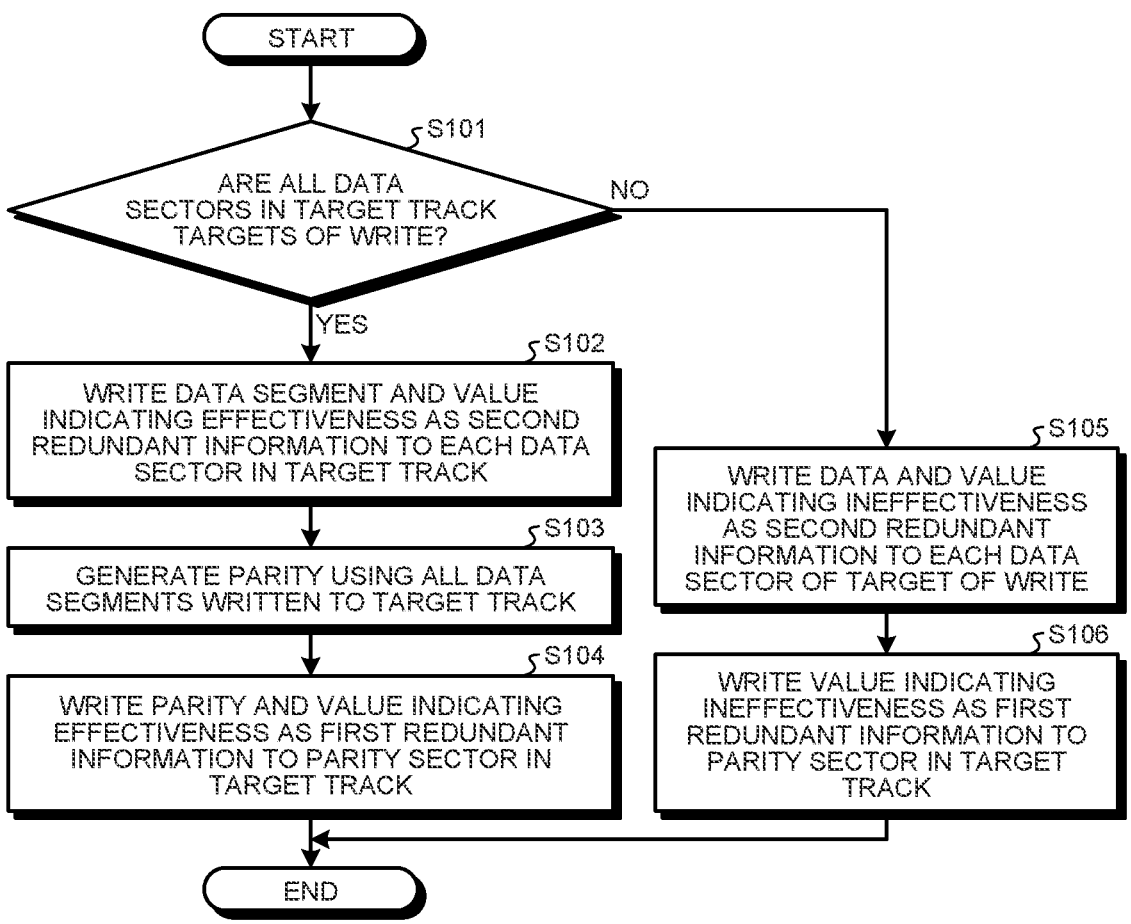
FIG. 4 is a flowchart illustrating an example of a write operation of the magnetic disk apparatus according to the first embodiment.

FIG. 4 is a flowchart illustrating an example of a write operation of the magnetic disk apparatus 1 according to the first embodiment. In the description of this drawing, a track 41 including a data sector as a target of write is referred to as "target track 41".

First, the controller 30 determines whether all data sectors in the target track 41 are targets of write (S101).

Data requested by the host 2 to be written is accumulated in the buffer memory 29. The controller 30 divides the data within the buffer memory 29 into one or more data segments in units of sectors and manages the data segments by coordinating each data segment with a data sector where each data segment is to be written. The controller 30 selects one or more data segments to be written to the target track 41 from the data accumulated in the buffer memory 29. On the basis of sectors where the selected one or more data segments are to be written, the controller 30 determines whether all the data sectors in the target track 41 are targets of write.

For example, according to the example of FIG. 3, when n data segments to be written to Sectors #1 to #n are selected, the controller 30 determines that all the data sectors in the target track 41 are targets of write. When one or more data segments to be written to one or more sectors being part of Sectors #1 to #n are selected and Sectors #1 to #n include a sector where write of a data segment is not implemented, the controller 30 determines that not all the data sectors in the target track 41 are targets of write and that one or more data sectors being part of the target track 41 are targets of write.

When all the data sectors in the target track 41 are targets of write (S101: Yes), the controller 30 writes a data segment and a value indicating effectiveness as the second redundant information to each data sector in the target track 41 (S102). Moreover, the controller 30 generates parity by using all the data segments written to the target track 41 (S103). Next, the controller 30 writes the parity and the value indicating effectiveness as the first redundant information to the parity sector in the target track 41 (S104).

When one or more data sectors being part of the target track 41 are targets of write (S101: No), the controller 30 writes a data segment and a value indicating ineffectiveness as the second redundant information to each data sector as a target of write (S105). Still further, the controller 30 writes the value indicating ineffectiveness as the first redundant information to the parity sector in the target track 41 (S106).

After S104 or S106, the write operation ends.

When write of all the data sectors in the target track 41 is implemented by a series of operations illustrated in FIG. 4, the value indicating effectiveness of the protection by the parity is written as the first redundant information or the second redundant information in each data sector as a target of write and the parity sector. After that, when overwrite of one or more data sectors being part of the target track 41 is implemented, the value indicating ineffectiveness of the protection by the parity is written as the first redundant information or the second redundant information in each data sector as a target of write and the parity sector.

Figure 5:
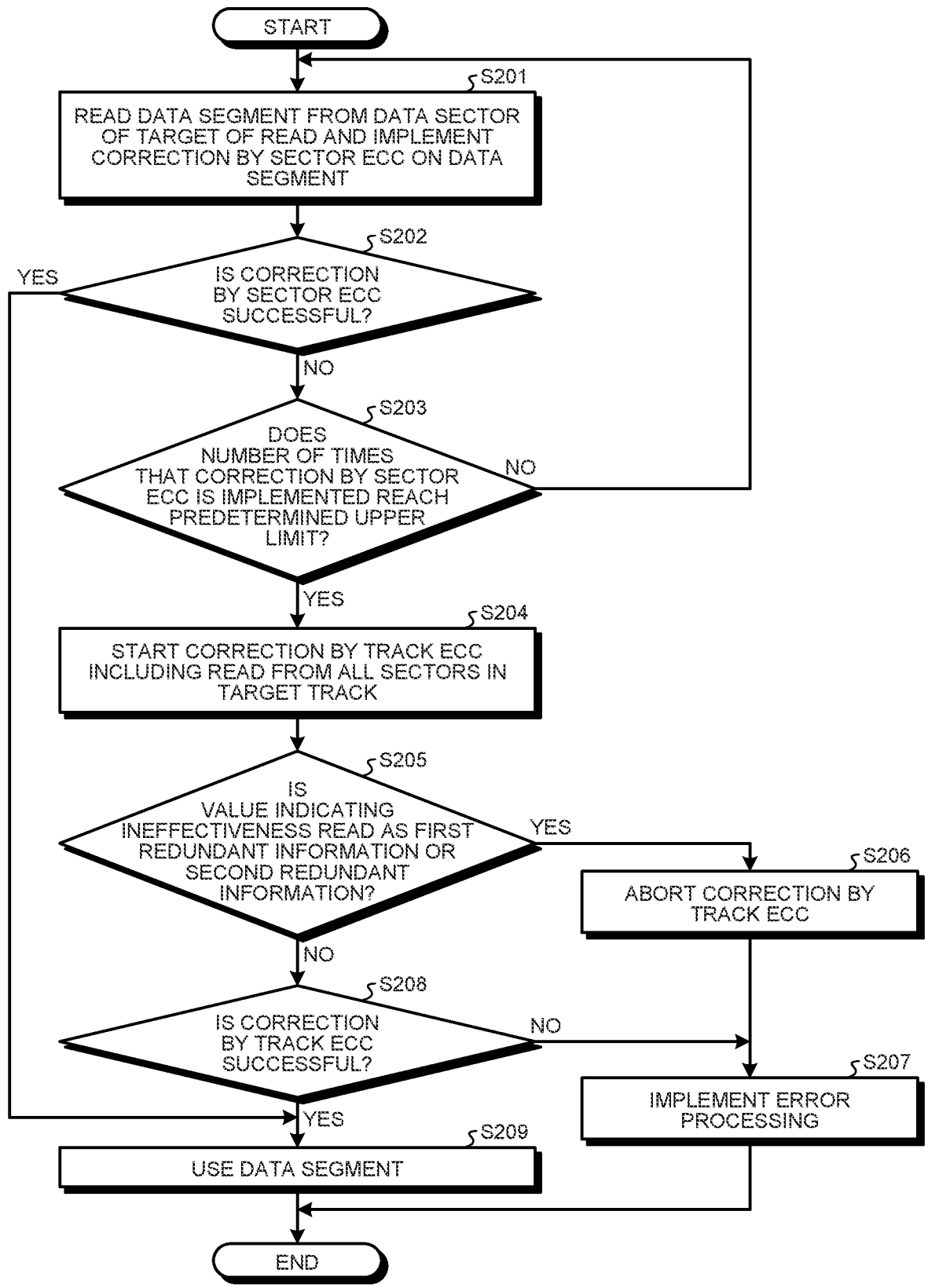
FIG. 5 is a flowchart illustrating an example of a read operation of the magnetic disk apparatus according to the first embodiment.

FIG. 5 is a flowchart illustrating an example of a read operation of the magnetic disk apparatus 1 according to the first embodiment. In the description of this drawing, a track 41 including a data sector as a target of read is referred to as "target track 41". This drawing illustrates an example where one data sector is treated as a target of read. In the description illustrated by this drawing, a data sector as a target of read may be one or more data sectors as targets of read. That is, the operation illustrate in this drawing can also be performed even when two or more data sectors are treated as targets of read.

First, the controller 30 reads a data segment from a data sector as a target of read and implements the correction by sector ECC on the read data segment (S201). The controller 30 determines whether the correction by sector ECC is successful (S202).

When the correction by sector ECC is unsuccessful (S202: No), the controller 30 determines whether the number of times that the correction by sector ECC is implemented reaches a predetermined upper limit (S203). When the number of times that the correction by sector ECC is implemented does not reach the predetermined upper limit (S203: No), the controller 30 proceeds to S201 and re-reads a data segment from a data sector as a target of read and the correction by sector ECC.

When the number of times that the correction by sector ECC is implemented reaches the predetermined upper limit (S203: Yes), the controller 30 starts the correction by track ECC (S204). In the correction by track ECC, the controller 30 reads from all sectors in the target track 41 and implements the correction by track ECC by using all data segments read and parity.

In the correction by track ECC, the controller 30 reads first redundant information or second redundant information as well as a data segment or the parity from each sector in the target track 41. The controller 30 determines whether a value indicating ineffectiveness is read as the first redundant information or the second redundant information (S205). When the value indicating ineffectiveness is read as the first redundant information or the second redundant information from at least one sector (S205: Yes), the controller 30 aborts the correction by track ECC (S206).

Note that the correction by track ECC is implemented, for example, in the RWC 25. The processor 26 implements determination of whether the value indicating ineffectiveness is read as the first redundant information or the second redundant information and also implements processing of stopping the correction by track ECC on the basis of a result of the determination. For this reason, there is a possibility that, after the correction by track ECC is completed, the processor 26 recognizes that the value indicating ineffectiveness is read as the first redundant information or the second redundant information. When it is found that the value indicating ineffectiveness is read as the first redundant information or the second redundant information after completion of the correction by track ECC, the controller 30 discards the data segments obtained by the correction by track ECC.

After S206, the controller 30 implements error processing (S207), and the read operation ends. The error processing is optionally designed. For example, in the error processing, the controller 30 notifies the host 2 that the read of a data from a data sector as a target of read fails.

When the correction by track ECC is completed and the value indicating ineffectiveness is not read as the first redundant information or the second redundant information from any sector during the correction by track ECC (S205: No), the controller 30 determines whether the correction by track ECC is successful (S208).

When the correction by sector ECC is successful (S202: Yes) or when the correction by track ECC is successful (S208: Yes), the controller 30 uses the data segments obtained by the correction by sector ECC or the correction by track ECC (S209), and the read operation ends. As described above, using a data segment signifies, for example, transmission of the data segment to the host 2 via the buffer memory 29.

When the correction by track ECC is unsuccessful (S208: No), the control proceeds to S207, and the controller 30 implements the error processing.

According to the aforementioned configuration, the second redundant information is written to each data sector in addition to a data segment. A configuration for writing the second redundant information to each data sector is optional. Even when the second redundant information is not written to each data sector, the controller 30 determines effectiveness or ineffectiveness of the protection by the parity as long as the first redundant information is written to the parity sector.

For example, in writing to all data sectors in the track 41, the controller 30 writes data segments to all the data sectors in the track 41, generates parity on the basis of all the data segments written to all the data sectors in the track 41, and writes the parity and the value indicating effectiveness of the protection by the parity as the first redundant information to the parity sector. In overwriting to one or more data sectors being part of the track 41 after the write to all the data sectors in the track 41, the controller 30 overwrites a data segment to each of the one or more data sectors as targets of write and overwrites the value indicating ineffectiveness of the protection by the parity as the first redundant information to the parity sector. In the correction by track ECC, when the first redundant information read from the parity sector indicates ineffectiveness, the controller 30 aborts the correction by track ECC or discards data segments obtained by the correction by track ECC. When the first redundant information read from the parity sector indicates effectiveness, the controller 30 uses the data segments obtained by the correction by track ECC.

In the first embodiment, in writing to all the data sectors in the track 41, the controller 30 writes not only a data segment but also the value indicating effectiveness of the protection by the parity as the second redundant information to each data sector. In overwriting to one or more data sectors being part of the track 41 after the write to all the data sectors in the track 41, the controller 30 overwrites not only a data segment but also the value indicating ineffectiveness of the protection by the parity as the second redundant information to each of the one or more data sectors as targets of write.

When either the first redundant information or the second redundant information read during the correction by track ECC indicates ineffectiveness, the controller 30 determines that the protection by the parity is ineffective.

Specifically, in the correction by track ECC, the controller 30 reads from all sectors in the track 41 and starts error correction using all data segments read from all the data sectors and the parity read from the parity sector. When all the first redundant information or all the second redundant information read from all the sectors indicate that the protection by the parity is effective, the controller 30 does not abort the correction by track ECC and uses data segments obtained by the correction by track ECC. When either the first redundant information or the second redundant information read from all the sectors indicate that the protection by the parity is ineffective, the controller 30 aborts the correction by track ECC or does not use the data segments obtained by the correction by track ECC.

Accordingly, in the correction by track ECC, when the magnetic head 22 passes through a data sector where the value indicating ineffectiveness is written as the second redundant information before reaching the parity sector, the controller 30 recognizes ineffectiveness of the protection by the parity at the time of reading the value indicating ineffectiveness as the second redundant information. It is possible to quickly determine ineffectiveness of the protection by the parity, which enables reduction in time required for the read.

As described above, according to the first embodiment, a plurality of sectors in the track 41 includes a plurality of data sectors where data segments are to be written and the parity sector where the parity and the first redundant information indicating effectiveness or ineffectiveness of the protection by the parity are to be written.

Accordingly, there is no need for the RAM 27 to store the management information in which effectiveness or ineffectiveness of the protection by the parity is recorded for each track. Therefore, the RAM 27 is downsized in the first embodiment as compared with Comparative Example. In addition, it is possible to prevent deterioration in response performance to the host 2 which is attributed to a process for storing an update of the management information within the RAM 27 in the magnetic disk 11. Moreover, there is no need to store an update of the management information in the FROM 28 when the power supply is stopped. That is, it is possible to appropriately manage effectiveness or ineffectiveness of the protection by the parity written to the parity sector as compared with Comparative Example.

First Modification

A magnetic disk apparatus 1 according to a first modification will be described as a modification of the first embodiment. The magnetic disk apparatus 1 according to the first modification is different in read operation from the magnetic disk apparatus 1 according to the first embodiment.

Figure 6:
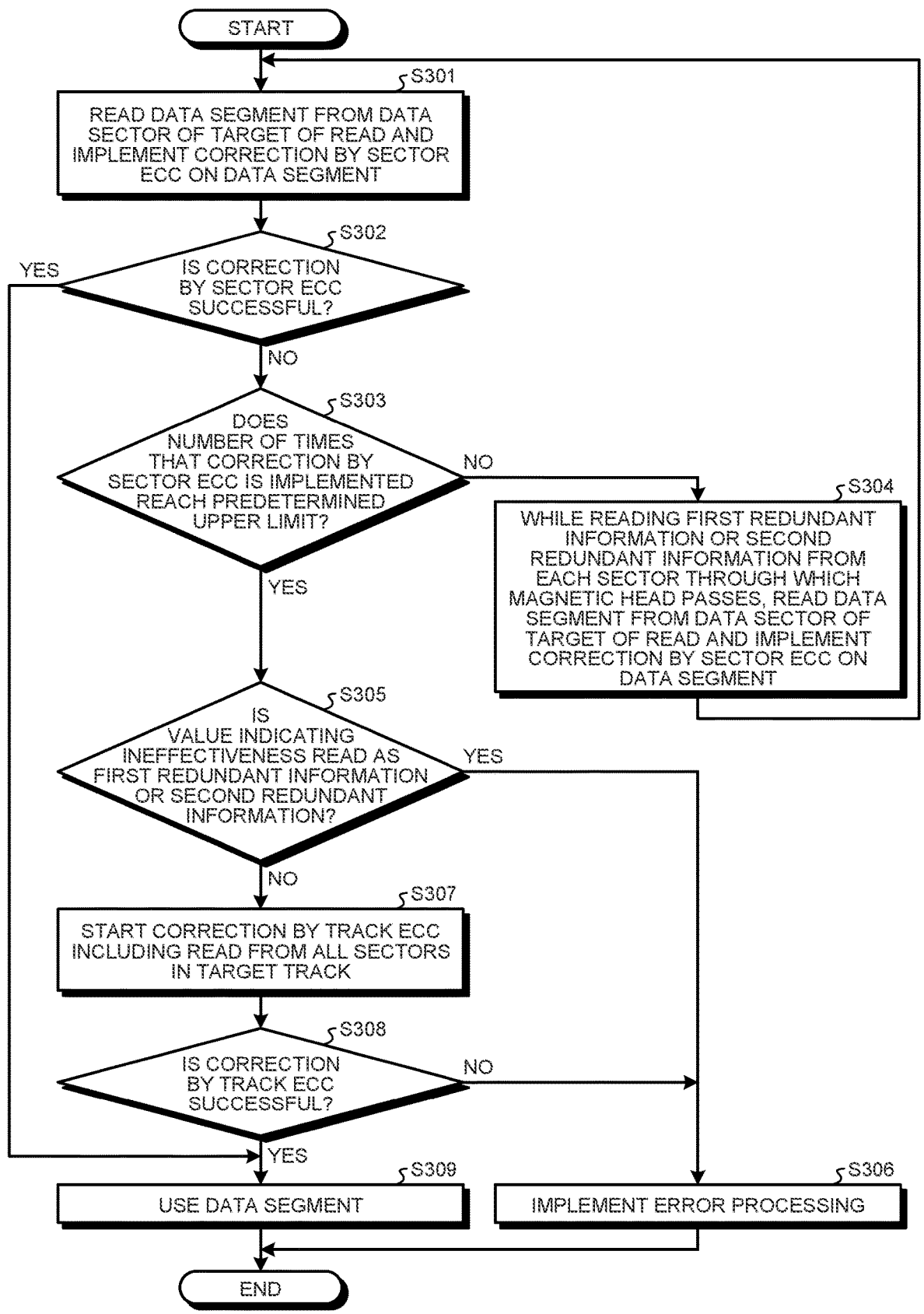
FIG. 6 is a flowchart illustrating an example of a read operation of a magnetic disk apparatus according to a first modification.

FIG. 6 is a flowchart illustrating an example of a read operation of the magnetic disk apparatus 1 according to the first modification. In the description of this drawing, a track 41 including a data sector as a target of read is referred to as "target track 41." This drawing illustrates an example where one data sector is treated as a target of read. In the description illustrated by this drawing, a data sector as a target of read may be one or more data sectors as targets of read. That is, the operation illustrated in this drawing can also be performed even when two or more data sectors are treated as targets of read.

First, in S301 and S302, a controller 30 implements processing similar to S201 and S202 illustrated in FIG. 5.

When correction by sector ECC is unsuccessful (S302: No), the controller 30 determines whether the number of times that the correction by sector ECC is implemented reaches a predetermined upper limit as in S203 illustrated in FIG. 5 (S303).

When the number of times that the correction by sector ECC is implemented does not reach the predetermined upper limit (S303: No), the controller 30 reads a data segment from a data sector as a target of read and re-implements the correction by sector ECC on the read data segment (S304). When the read and the correction by sector ECC on the data sector as a target of read are re-implemented, a magnetic head 22 is positioned on the target track 41. In S304, the controller 30 reads first redundant information or second redundant information when the magnetic head 22 passes through each sector in the target track 41.

When the number of times that the correction by sector ECC is implemented reaches the predetermined upper limit (S303: Yes), the controller 30 determines whether a value indicating ineffectiveness is read as the first redundant information or the second redundant information in S304 (S305).

When the value indicating ineffectiveness is read as the first redundant information or the second redundant information from at least one sector (S305: Yes), the controller 30 implements error processing (S306), and the read operation ends. The error processing implemented in S306 is, for example, similar to the error processing implemented in S207 illustrated in FIG. 5.

When the value indicating ineffectiveness is not read as the first redundant information or the second redundant information from any sector (S305: No), the controller 30 starts correction by track ECC (S307). In the correction by track ECC, the controller 30 reads from all sectors in the target track 41 and implements the correction by track ECC by using all data segments read and the parity.

When the correction by track ECC is completed, the controller 30 determines whether the correction by track ECC is successful (S308).

When the correction by sector ECC is successful (S302: Yes) or when the correction by track ECC is successful (S308: Yes), the controller 30 uses the data segments obtained by the correction by sector ECC or the correction by track ECC (S309), and the read operation ends.

When the correction by track ECC is unsuccessful (S308: No), the control proceeds to S306, and the controller 30 implements the error processing.

In the first modification, the first redundant information or the second redundant information is read from each sector when the read and the correction by sector ECC on a data sector as a target of read are re-implemented, so that effectiveness or ineffectiveness of the protection by the parity is determined before the correction by track ECC starts. When effectiveness or ineffectiveness of the protection by the parity is determined, the error processing is implemented without starting the correction by track ECC.

Accordingly, it is possible to further reduce the time required for the read.

Second Embodiment

A magnetic disk apparatus 1a according to a second embodiment will be described. Similarities to the magnetic disk apparatus 1 according to the first embodiment will be omitted or described briefly.

Figure 7:
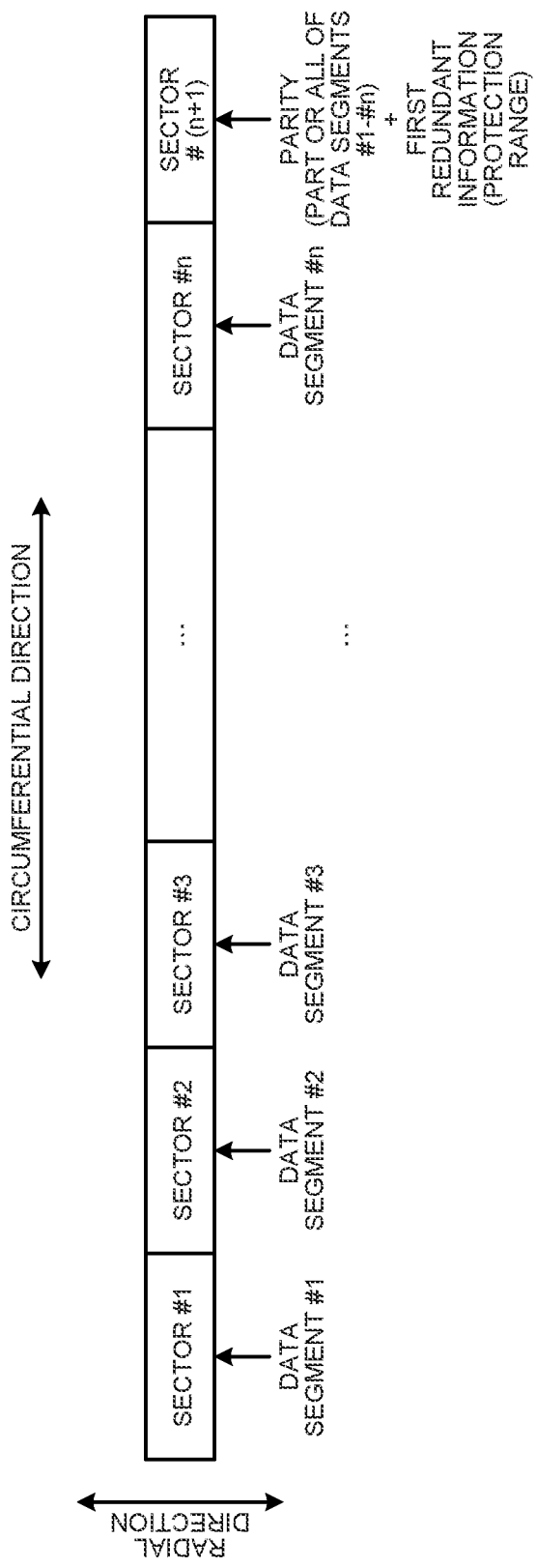
FIG. 7 is a schematic view illustrating an example of a configuration of one track according to a second embodiment.

FIG. 7 is a schematic view illustrating an example of a configuration of one track 41 according to the second embodiment. In the drawing, illustration of the servo regions 42 is omitted.

In the second embodiment, a data segment is written to each data sector. However, unlike the first embodiment, second redundant information is not written to each data sector.

Parity generated on the basis of data segments written to one or more data sectors is written to a parity sector. In addition, together with the parity, information indicating a range where one or more data segments used for generation of the parity are written is written to the parity sector as first redundant information. That is, one or more data segments written to the range indicated by the first redundant information are protected by the parity. In other words, the first redundant information indicates the range where protection by the parity is effective.

Figure 8:
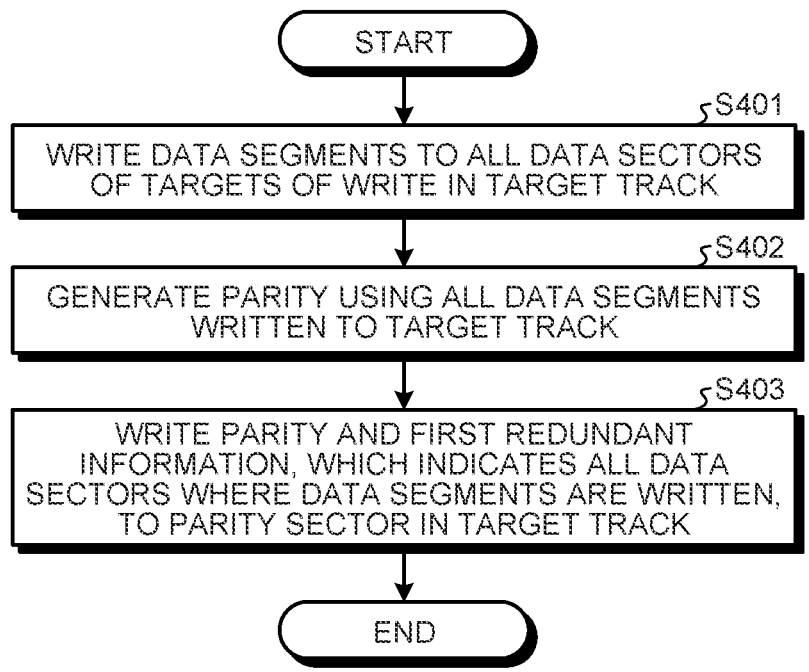
FIG. 8 is a flowchart illustrating an example of a write operation of a magnetic disk apparatus according to the second embodiment.

FIG. 8 is a flowchart illustrating an example of a write operation of the magnetic disk apparatus 1a according to the second embodiment. In the description of this drawing, a track 41 including a data sector as a target of write is referred to as "target track 41".

A controller 30 writes data segments to all data sectors as targets of write in the target track 41 (S401). When all the data sectors in the target track 41 are targets of write, the controller 30 writes data segments to all the data sectors. When one or more data sectors being part of the target track 41 are targets of write, the controller 30 writes data segments to the one or more data sectors as targets of write.

Moreover, the controller 30 generates parity for correction by track ECC by using all the data segments written to the target track 41, namely, all the data segments written in S401 (S402). The controller 30 writes the parity and a value indicating a protection range as the first redundant information to the parity sector in the target track 41 (S403). The write operation ends.

The value indicating the protection range written in S403 indicates all the data sectors where the data segments are written in S401.

Figure 9:
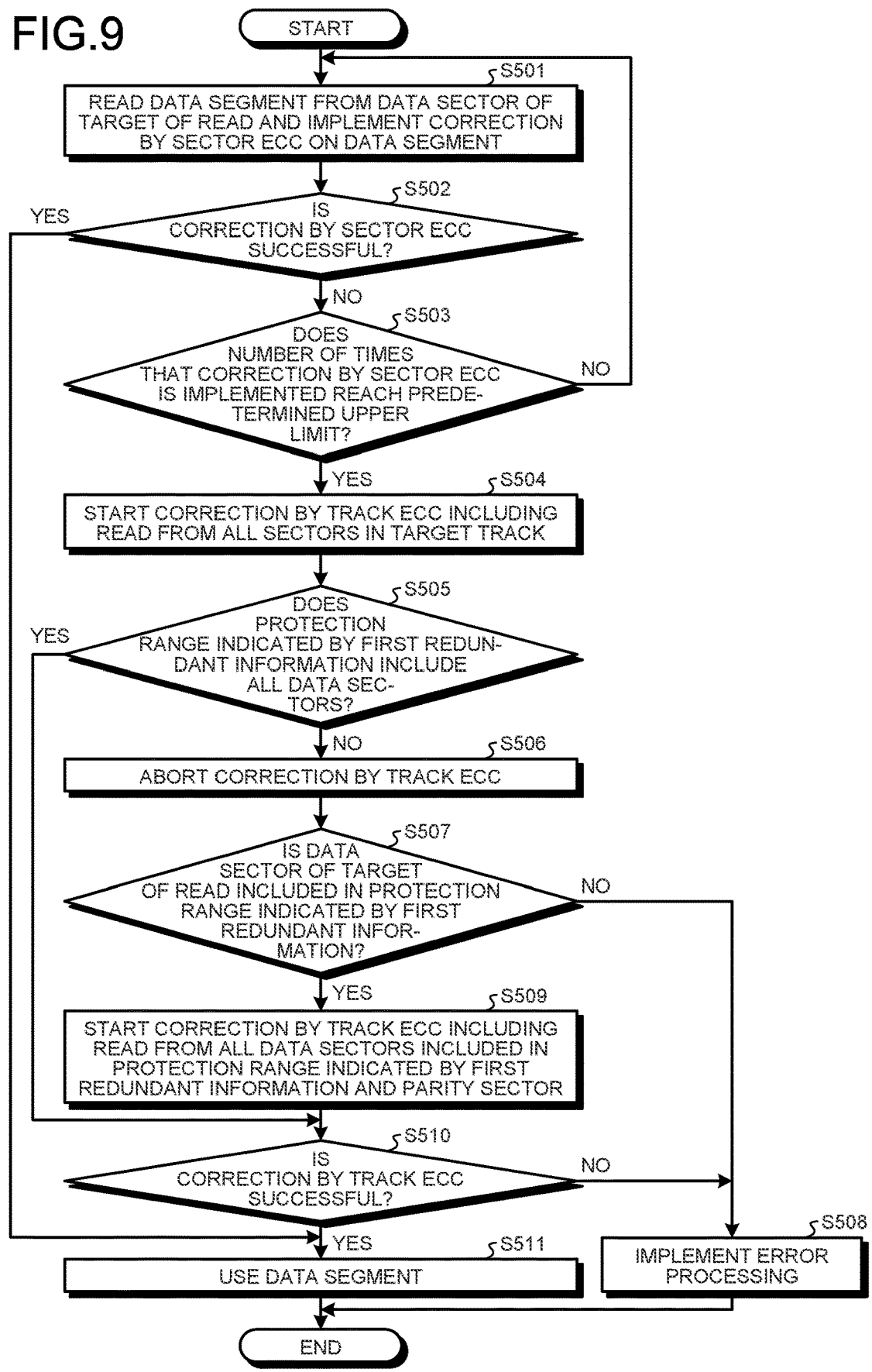
FIG. 9 is a flowchart illustrating an example of a read operation of the magnetic disk apparatus according to the second embodiment.

FIG. 9 is a flowchart illustrating an example of a read operation of the magnetic disk apparatus 1a according to the second embodiment. In the description of this drawing, a track 41 including a data sector as a target of read is referred to as "target track 41". This drawing illustrates an example where one data sector is treated as a target of read. In the description illustrated by this drawing, a data sector as a target of read may be one or more data sectors as targets of read. That is, the operation illustrated in this drawing can also be performed even when two or more data sectors are treated as targets of read.

First, the controller 30 reads a data segment from a data sector as a target of read and implements correction by sector ECC on the read data segment (S501). The controller 30 determines whether the correction by sector ECC is successful (S502).

When the correction by sector ECC is unsuccessful (S502: No), the controller 30 determines whether the number of times that the correction by sector ECC is implemented reaches a predetermined upper limit (S503). When the number of times that the correction by sector ECC is implemented does not reach the predetermined upper limit (S503: No), the controller 30 proceeds to S501 and re-reads a data segment and the correction by sector ECC.

When the number of times that the correction by sector ECC is implemented reaches the predetermined upper limit (S503: Yes), the controller 30 starts the correction by track ECC (S504). In the correction by track ECC, the controller 30 reads from all sectors in the target track 41 and implements the correction by track ECC by using all data segments read and the parity.

In the correction by track ECC, the controller 30 determines whether the protection range indicated by the first redundant information read from the parity sector includes all data sectors (S505).

When the protection range indicated by the first redundant information does not include all the data sectors (S505: No), data segments in the data sectors as targets of read cannot be obtained without an error by the correction by track ECC started in S505. Accordingly, the controller 30 aborts the correction by track ECC (S506). When it is determined that the protection range indicated by the first redundant information does not include all the data sectors after completion of the correction by track ECC, the controller 30 discards the data segments obtained by the correction by track ECC.

The controller 30 determines whether a data sector as a target of read is included in the protection range indicated by the first redundant information (S507).

When the data sector as a target of read is not included in the protection range indicated by the first redundant information (S507: No), a data segment of the data sector as a target of read cannot be obtained without an error by error correction using the parity. Accordingly, the controller 30 implements error processing (S508), and the read operation ends. The error processing implemented in S508 is, for example, similar to the error processing implemented in the first embodiment.

When the data sector as a target of read is included in the protection range indicated by the first redundant information (S507: Yes), the controller 30 starts the correction by track ECC again (S509). In the correction by track ECC started in S509, note that the controller 30 also implements read from all the data sectors included in the protection range indicated by the first bit information and the parity sector. The controller 30 implements the correction by track ECC on the basis of the data segments read from all the data sectors included in the protection range indicated by the first bit information and the parity read from the parity sector.

After the correction by track ECC started in S509 is completed or when the protection range indicated by the first redundant information includes all the data sectors (S505: Yes), the controller 30 determines whether the correction by track ECC is successful (S510).

When the correction by sector ECC is successful (S502: Yes) or when the correction by track ECC is successful (S510: Yes), the controller 30 uses the data segments obtained by the correction by sector ECC or the correction by track ECC (S511), and the read operation ends.

When the correction by track ECC is unsuccessful (S510: No), the control proceeds to S508, and the controller 30 implements the error processing.

As described above, according to the second embodiment, the plurality of sectors in the track 41 includes a plurality of data sectors where data segments are to be written and the parity sector where the parity and the first redundant information indicating the range where the protection by the parity is effective are to be written.

Accordingly, there is no need for the RAM 27 to store the management information in which effectiveness or ineffectiveness of the protection by the parity is recorded for each track. That is, as in the first embodiment, it is possible to appropriately manage effectiveness or ineffectiveness of the protection by the parity written to the parity sector as compared with Comparative Example.

In addition, according to the second embodiment, when write is implemented to one or more data sectors being part of the data sectors in the track 41, the controller 30 generates the parity on the basis of all data segments written to the one or more data sectors as targets of write. The controller 30 writes the parity and a value indicating the one or more data sectors as targets of write to the parity sector.

Accordingly, even when all the data sectors in the track 41 are not targets of write, it is possible to make the protection by the parity effective for the data segments written to the data sectors as targets of write. That is, the reliability of the data segments written to the data sectors is improved.

Moreover, according to the second embodiment, the controller 30 starts the correction by track ECC when the read from one or more data sectors fails. In the correction by track ECC, the controller 30 starts the correction by track ECC using all the data segments read from all the data sectors in the track 41 and the parity read from the parity sector. When the protection range indicated by the first redundant information is all the data sectors in the track 41, the controller 30 uses data obtained by the correction by track ECC. When the protection range indicated by the first redundant information is not all the data sector in the track 41, the controller 30 aborts the correction by track ECC or discards the data obtained by the correction by track ECC. When one or more data sectors as targets of read are included in the protection range indicated by the first redundant information after the correction by track ECC is aborted or the data obtained by the correction by track ECC is discarded, the controller 30 implements read from the parity sector and all the data sectors included in the protection range indicated by the first redundant information, starts the correction by track ECC using all the data segments read from all the data sectors included in the protection range indicated by the first redundant information and the parity read from the parity sector, and uses the data segments obtained by the correction by track ECC.

Accordingly, even when all the data sectors in the track 41 are not targets of write, it is possible to obtain data segments with no error by the correction by track ECC.

Second Modification

A magnetic disk apparatus 1a according to a second modification will be described as a modification of the second embodiment. The magnetic disk apparatus 1a according to the second modification is different in read operation from the magnetic disk apparatus 1a according to the second embodiment.

Figure 10:
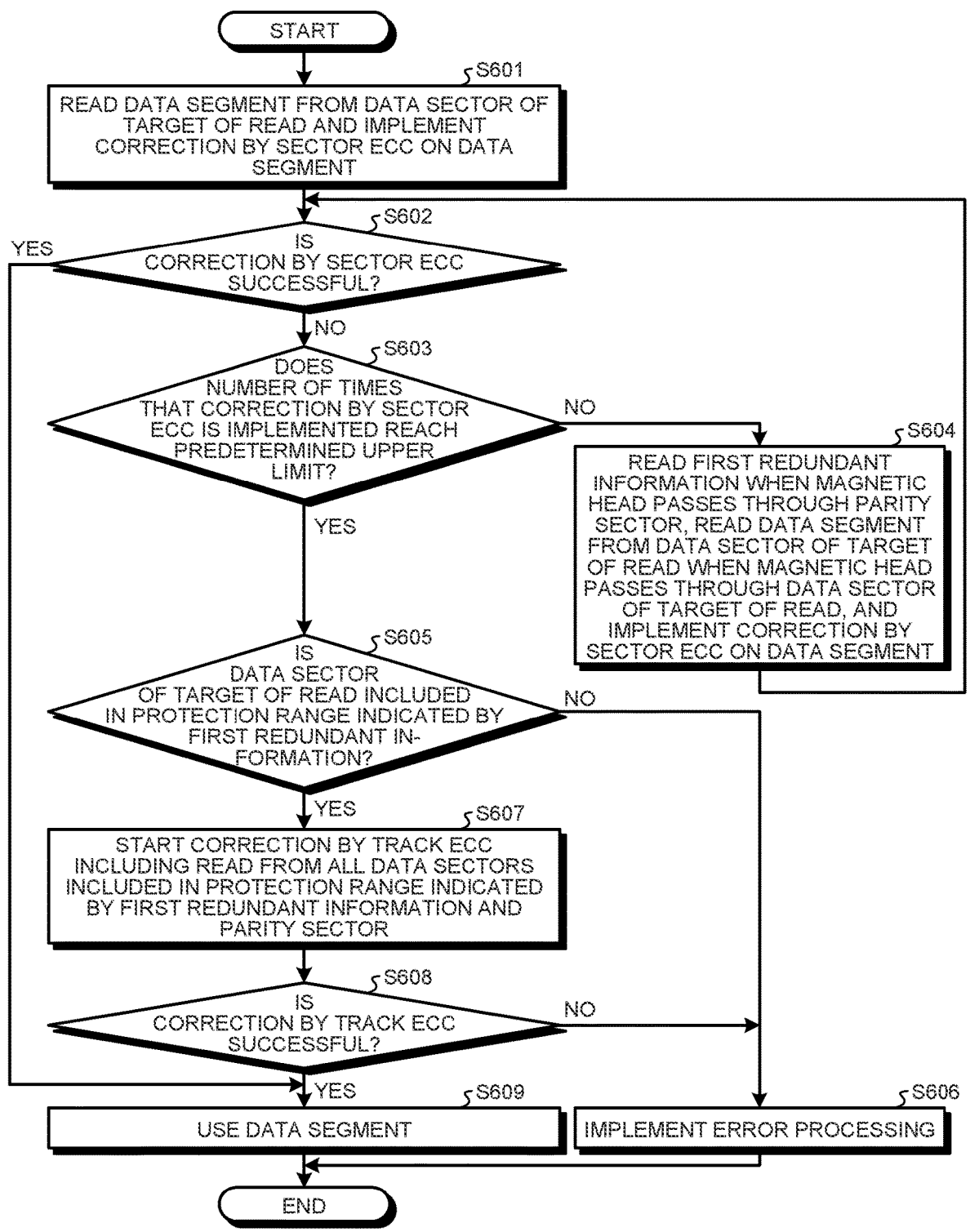
FIG. 10 is a flowchart illustrating an example of a read operation of a magnetic disk apparatus according to a second modification.

FIG. 10 is a flowchart illustrating an example of a read operation of the magnetic disk apparatus 1a according to the second modification. This drawing illustrates an example where one data sector is set as a target of read. In the description illustrated by this drawing, a data sector as a target of read may be one or more data sectors as targets of read. That is, the operation illustrated in this drawing can also be performed even when two or more data sectors are treated as targets of read.

First, in S601 and S602, a controller 30 implements processing similar to S501 and S502 illustrated in FIG. 9.

When correction by sector ECC is unsuccessful (S602: No), the controller 30 determines whether the number of times that the correction by sector ECC is implemented reaches a predetermined upper limit as in S503 illustrated in FIG. 9 (S603).

When the number of times that the correction by sector ECC is implemented does not reach the predetermined upper limit (S603: No), the controller 30 reads a data segment from a data sector as a target of read and re-implements the correction by sector ECC on the read data segment (S604). When the read and the correction by sector ECC on the data sector as a target of read are re-implemented, a magnetic head 22 is positioned on the target track 41. In S304, the controller 30 reads first redundant information when the magnetic head 22 passes through a parity sector. When the magnetic head 22 passes through the data sector as a target of read, the controller 30 reads a data segment from the data sector as a target of read.

When the number of times that the correction by sector ECC is implemented reaches the predetermined upper limit (S603: Yes), the controller 30 determines whether the data sector as a target of read is included in a protection range indicated by the first redundant information read in the processing of S604 (S605).

When a data sector as a target of read is not included in the protection range indicated by the first redundant information (S605 No), data written to the data sector as a target of read cannot be obtained without an error by error correction using the parity. Accordingly, the controller 30 implements error processing (S606), and the read operation ends. The error processing implemented in S606 is, for example, similar to the error processing implemented in the first embodiment.

When the data sector as a target of read is included in the protection range indicated by the first redundant information (S605: Yes), the controller 30 starts correction by track ECC (S607). In the correction by track ECC, the controller 30 includes the read from all the data sectors included in the protection range indicated by the first bit information and the parity sector. The controller 30 implements the correction by track ECC on the basis of the data segments read from all the data sectors included in the protection range indicated by the first bit information and the parity read from the parity sector.

When the correction by track ECC is completed, the controller 30 determines whether the correction by track ECC is successful (S608).

When the correction by sector ECC is successful (S602: Yes) or when the correction by track ECC is successful (S608: Yes), the controller 30 uses the data segments obtained by the correction by sector ECC or the correction by track ECC (S609), and the read operation ends.

When the correction by track ECC is unsuccessful (S608: No), the control proceeds to S606, and the controller 30 implements the error processing.

In the first modification, the first redundant information is read from the parity sector when the read and the correction by sector ECC on the data sector as a target of read are re-implemented, so that whether the data sector as a target of read is protected by the parity is determined before the correction by track ECC starts. When it is found that the data sector as a target of read is not protected by the parity, the error processing is implemented without starting the correction by track ECC.

Accordingly, it is possible to further reduce the time required for the read.

According to the first embodiment, the second embodiment, and the modifications thereof, the first redundant information for controlling the correction by track ECC is written to the parity sector. Therefore, the magnetic disk apparatuses 1 and 1a implement the following characteristic operations. That is, the controller 30 implements, by using the magnetic head 22, write to the parity sector in accordance with the write to one or more data sectors being part of the track 41.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk provided with a track including a plurality of first sectors, the plurality of first sectors including a plurality of second sectors where data segments are written and a third sector where parity and first information indicating effectiveness or ineffectiveness of protection by the parity are written;
a magnetic head; and
a controller configured to access the magnetic disk by using the magnetic head, wherein
the controller is configured to, when implementing write to all the plurality of second sectors,
generate parity on the basis of all data segments written to the plurality of second sectors, and
write, to the third sector, the parity and a value indicating effectiveness of the protection by the parity as the first information, and the controller is configured to, when implementing overwrite to part of the plurality of second sectors after the write to all the plurality of second sectors,
overwrite a value indicating ineffectiveness of the protection by the parity as the first information.

2. A magnetic disk apparatus comprising:
a magnetic disk provided with a track including a plurality of first sectors, the plurality of first sectors including a plurality of second sectors where data segments are written and a third sector where parity and first information indicating effectiveness or ineffectiveness of protection by the parity are written;
a magnetic head; and
a controller configured to access the magnetic disk by using the magnetic head, wherein
the controller is configured to, when implementing write to all the plurality of second sectors,
write, to each second sector in the plurality of second sectors, a data segment and a value indicating effectiveness of the protection by the parity as second information,
generate parity on the basis of all data segments written to the plurality of second sectors, and
write, to the third sector, the parity and the value indicating effectiveness of the protection by the parity as the first information, and
the controller is configured to, when implementing overwrite to one or more fourth sectors being part of the plurality of second sectors after the write to all the plurality of second sectors,
overwrite, to the one or more fourth sectors, a data segment and a value indicating ineffectiveness of the protection by the parity as the second information, and
overwrite, to the third sector, the value indicating ineffectiveness of the protection by the parity as the first information.

3. The magnetic disk apparatus according to claim 2, wherein the controller is configured to
implement read from the plurality of first sectors,
start error correction using all data segments read from the plurality of second sectors and the parity read from the third sector,
use the data segments obtained by the error correction when all the second information read from the plurality of second sectors and the first information read from the third sector indicate effectiveness of the protection by the parity, and
abort the error correction or discard the data segments obtained by the error correction when either the second information read from the plurality of second sectors or the first information read from the third sector indicates ineffectiveness of the protection by the parity.

4. The magnetic disk apparatus according to claim 2, wherein
the controller is configured to
read one or more fifth sectors being one or more second sectors in the plurality of second sectors, and
implement read from the plurality of first sectors including re-implementation of read from the one or more fifth sectors when the read from the one or more fifth sectors fails, and
the controller is configured to, after the re-implementation of read from the one or more fifth sectors fails,
implement error correction using the parity when all the second information and the first information read from the plurality of first sectors indicate the effectiveness of the protection by the parity, and perform no error correction using the parity when either all the second information or the first information read from the plurality of first sectors indicates the ineffectiveness of the protection by the parity.

5. A magnetic disk apparatus comprising:

a magnetic disk provided with a track including a plurality of first sectors, the plurality of first sectors including a plurality of second sectors where data segments are written and a third sector where parity and first information are written, the first information indicating a range where protection by the parity is effective in the plurality of second sectors;

a magnetic head; and a controller configured to access the magnetic disk by using the magnetic head, wherein the controller is configured to, when implementing one or more fourth sectors being one or more second sectors in the plurality of second sectors, generate parity on the basis of all data segments written to the one or more fourth sectors, and write, to the third sector, the parity and a value as the first information indicating the one or more fourth sectors.

6. The magnetic disk apparatus according to claim 5, wherein the controller is configured to implement read from one or more fifth sectors being one or more second sectors in the plurality of second sectors, implement read from the plurality of first sectors after the read from the one or more fifth sectors fails and start first error correction using all data segments read from the plurality of second sectors and the parity read from the third sector, use the data segments obtained by the first error correction when the one or more fourth sectors indicated by the first information match the plurality of second sectors, and abort the first error correction or discard the data segments obtained by the first error correction when the one or more fourth sectors indicated by the first information do not match the plurality of second sectors, and the controller is configured to, after the first error correction is aborted or the data segments obtained by the first error correction are discarded, implement read from the one or more fourth sectors and the third sector when the one or more fifth sectors are included in the one or more fourth sectors indicated by the first information, start second correction using all data segments read from the one or more fourth sectors and the parity read from the third sector, and use the data segments obtained by the second error correction.

7. The magnetic disk apparatus according to claim 5, wherein the controller is configured to implement read from one or more fifth sectors being one or more second sectors in the plurality of second sectors, and re-implement read from the one or more fifth sectors when the read of the one or more fifth sectors fails and implement read of the first information when the magnetic head passes through the third sector in the re-implementation of the read from the one or more fifth sectors, and the controller is configured to, after the re-implementation of read from the one or more fifth sectors fails, implement error correction using the parity when the one or more fifth sectors are included in the one or more fourth sectors indicated by the first information, and perform no error correction using the parity when the one or more fifth sectors are not included in the one or more fourth sectors indicated by the first information.

8. A method of controlling a magnetic disk apparatus including a magnetic disk provided with a track including a plurality of first sectors, the plurality of first sectors including a plurality of second sectors where data segments are written and a third sector where parity and first information indicating effectiveness or ineffectiveness of protection by the parity are written, the method comprising:

when implementing write to all the plurality of second sectors, generating parity on the basis of all data segments written to the plurality of second sectors, and writing, to the third sector, the parity and a value indicating effectiveness of the protection by the parity as the first information; and when implementing overwrite to part of the plurality of second sectors after the write to all the plurality of second sectors, overwriting a value indicating ineffectiveness of the protection by the parity as the first information.

9. The method according to claim 8, further comprising:

when implementing write to all the plurality of second sectors, writing, to each second sector in the plurality of second sectors, a data segment and a value indicating effectiveness of the protection by the parity as second information, generating parity on the basis of all data segments written to the plurality of second sectors, and writing, to the third sector, the parity and the value indicating effectiveness of the protection by the parity as the first information; and, when implementing overwrite to one or more fourth sectors being part of the plurality of second sectors after the write to all the plurality of second sectors, overwriting, to the one or more fourth sectors, a data segment and a value indicating ineffectiveness of the protection by the parity as the second information, and overwriting, to the third sector, the value indicating ineffectiveness of the protection by the parity as the first information.

10. The method according to claim 9, further comprising:

implementing read from the plurality of first sectors;

starting error correction using all data segments read from the plurality of second sectors and the parity read from the third sector;

using the data segments obtained by the error correction when all the second information read from the plurality of second sectors and the first information read from the third sector indicate effectiveness of the protection by the parity; and aborting the error correction or discarding the data segments obtained by the error correction when either the second information read from the plurality of second sectors or the first information read from the third sector indicates ineffectiveness of the protection by the parity.

11. The method according to claim 9, further comprising:
reading one or more fifth sectors being one or more second sectors in the plurality of second sectors;
implementing read from the plurality of first sectors including re-implementation of read from the one or more fifth sectors when the read from the one or more fifth sectors fails; and
after the re-implementation of read from the one or more fifth sectors fails,
    implementing error correction using the parity when all the second information and the first information read from the plurality of first sectors indicate the effectiveness of the protection by the parity, and
    performing no error correction using the parity when either all the second information or the first information read from the plurality of first sectors indicates the ineffectiveness of the protection by the parity.

12. A method of controlling a magnetic disk apparatus including a magnetic disk provided with a track including a plurality of first sectors, the plurality of first sectors including a plurality of second sectors where data segments are written and a third sector where parity and first information are written, the first information indicating a range where protection by the parity is effective in the plurality of second sectors, the method comprising:
when implementing one or more fourth sectors being one or more second sectors in the plurality of second sectors,
    generating parity on the basis of all data segments written to the one or more fourth sectors; and
    writing, to the third sector, the parity and a value as the first information indicating the one or more fourth sectors.

13. The method according to claim 12, further comprising:
implementing read from one or more fifth sectors being one or more second sectors in the plurality of second sectors;
implementing read from the plurality of first sectors after the read from the one or more fifth sectors fails and start first error correction using all data segments read from the plurality of second sectors and the parity read from the third sector;
using the data segments obtained by the first error correction when the one or more fourth sectors indicated by the first information match the plurality of second sectors;
aborting the first error correction or discarding the data segments obtained by the first error correction when the one or more fourth sectors indicated by the first information do not match the plurality of second sectors; and,
after the first error correction is aborted or the data segments obtained by the first error correction are discarded,
    implementing read from the one or more fourth sectors and the third sector when the one or more fifth sectors are included in the one or more fourth sectors indicated by the first information,
    starting second correction using all data segments read from the one or more fourth sectors and the parity read from the third sector, and
    using the data segments obtained by the second error correction.

14. The method according to claim 12, further comprising:
implementing read from one or more fifth sectors being one or more second sectors in the plurality of second sectors;
re-implementing read from the one or more fifth sectors when the read of the one or more fifth sectors fails and implement read of the first information when the magnetic head passes through the third sector in the re-implementation of the read from the one or more fifth sectors; and,
after the re-implementation of read from the one or more fifth sectors fails,
    implementing error correction using the parity when the one or more fifth sectors are included in the one or more fourth sectors indicated by the first information, and
    performing no error correction using the parity when the one or more fifth sectors are not included in the one or more fourth sectors indicated by the first information.

* * * * *